United States Patent [19]

Satomi

[11] Patent Number: 4,842,765

[45] Date of Patent: Jun. 27, 1989

[54] AQUEOUS DISPERSION OF ORGANIC PEROXIDE

[75] Inventor: Nobuyuki Satomi, Aichi, Japan

[73] Assignee: Nippon Oil & Fats Co., Ltd., Tokyo, Japan

[21] Appl. No.: 100,967

[22] Filed: Sep. 25, 1987

[30] Foreign Application Priority Data

Oct. 7, 1986 [JP] Japan .................................. 61-237199

[51] Int. Cl.$^4$ ...................... C07C 179/00; C08F 4/32; C08F 4/34; C08F 2/18
[52] U.S. Cl. ........................... 252/186.26; 252/186.42; 502/160; 525/387; 526/230.5
[58] Field of Search ...................... 252/186.26, 186.42; 525/387; 502/160

[56] References Cited

U.S. PATENT DOCUMENTS

| | | | |
|---|---|---|---|
| 3,988,261 | 10/1976 | Barter et al. ........................ | 502/160 |
| 4,013,581 | 3/1977 | Huber .............................. | 252/186.26 |
| 4,198,369 | 4/1980 | Yoshikawa et al. ............ | 427/236 X |
| 4,396,527 | 8/1983 | Matsuyama et al. ........... | 252/186.23 |
| 4,403,994 | 9/1983 | Hignett ....................... | 252/186.26 X |
| 4,515,929 | 5/1985 | Tang .......................... | 252/186.26 X |
| 4,547,308 | 10/1985 | Torenbeek .................... | 252/186.26 |

FOREIGN PATENT DOCUMENTS 0032757 7/1981 European Pat. Off. .

Primary Examiner—John F. Terapane
Assistant Examiner—Virginia B. Caress
Attorney, Agent, or Firm—Oblon, Spivak, McClelland, Maier & Neustadt

[57] ABSTRACT

An aqueous dispersion of an organic peroxide which contains 0.01 to 10% by weight of crystalline cellulose and optionally further contains 0.001 to 10% by weight of at least one member selected from the group consisting of anionic surfactants and nonionic surfactants excels in shelf life, exhibits low viscosity, and is useful as a polymerization initiator for ethylenically unsaturated monomers.

5 Claims, No Drawings

AQUEOUS DISPERSION OF ORGANIC PEROXIDE

BACKGROUND OF THE INVENTION

This invention relates to an aqueous dispersion of an organic peroxide. More particularly, this invention relates to an aqueous dispersion of an organic peroxide which possesses highly desirable shelf life and low viscosity and is useful as a polymerization initiator for ethylenically unsaturated monomers.

The suspension or emulsion polymerization of an ethylenically unsaturated monomer is generally carried out by using a colloid protecting agent and/or a surfactant for the purpose of ensuring production of a particular polymer possessing a desired particle size and using a polymerization initiator for the purpose of initiating the polymerization.

Recently, in the production of an ethylenically unsaturated monomer, large, automated continuous and closed equipment is used for the purpose of enhancing the productivity and preventing pollution of the environment by the toxicity of residual or wasted monomer.

As a polymerization initiator suitable for the method of production described above, an organic peroxide suspended or emulsified in water for ease of use tends to be more highly rated than the conventional solid or liquid organic peroxide from the standpoint of ease of handling and safety.

Now, examples of the aqueous suspension and the aqueous emulsion mentioned above will be cited below. In the specification of Dutch Pat. No. 75 03051, there is disclosed an aqueous suspension comprising water, a protective colloid agent, a water-soluble cellulose derivative such as methyl cellulose, a solid organic peroxide such as dibenzoyl peroxide, at least 0.2% by weight of a non-ionic surfactant having an HLB value of not more than 12.5, and further at least 0.2% by weight of a non-ionic surfactant having an HLB value of not less than 12.5 or 0.01% by weight of an anionic surfactant.

In the specification of Swedish Pat. No. 80 00669 is disclosed an aqueous suspension which comprises water, a protective colloid agent, a water-soluble cellulose derivative such as, for example, hydroxyethyl cellulose, a solid organic peroxide such as dicetyl peroxydicarbonate, and an ethoxylated nonionic surfactant having an HLB value exceeding 15 and possessing no cyclic inner ether bond.

In the specification of European Pat. No. 32,757 there is disclosed an aqueous emulsion comprising water, a protective colloid agent, a water-soluble cellulose derivative, a liquid organic peroxide such as di-(2-ethylhexyl)peroxy dicarbonate, a surfactant, and 2 to 20% by weight of an alkanol having one to four carbon atoms and/or an alkane diol having two to four carbon atoms.

These aqueous dispersions, however, have the following problems. First, when the aqueous dispersion has a low viscosity, it shows extremely poor shelf life and tends to separate into two layers. Second, in the case of the aqueous dispersion exhibiting relatively satisfactory shelf life, it acquires such high viscosity as to make the conveyance thereof with a pump rather difficult. Third, the colloid protecting agent and the surfactant to be used as a dispersion stabilizer impair the stability of the polymerization system, lower the conversion, and spoil the polymer quality.

For example, the polymer is forced to exhibit insufficient volume resistivity and assume a flattened shape.

In the circumstances, there is a need for developing an aqueous dispersion which possesses a highly satisfactory shelf life, allows smooth conveyance with a pump, and, as a polymerization initiator, refrains from impairing the physical properties of the polymer being formed.

OBJECT AND SUMMARY OF THE INVENTION

The inventors, after a study continued to aim at satisfying the aforementioned need, have found that although cellulose derivatives including methyl cellulose degrade the properties of a polymer being produced, such as solubility, thermal stability and transparency, when a specific kind of cellulose is used as a dispersion stabilizer in an aqueous dispersion of an organic peroxide, this dispersion stabilizer neither impairs the condition of dispersion while the aqueous dispersion is undergoing polymerization nor degrades the physical properties thereof and that when an aqueous suspension of an organic peroxide using this dispersion stabilizer is prepared in a low viscosity enough for smooth conveyance with a pump, this aqueous suspension exhibits a highly desirable shelf life. The present invention has been perfected as the result.

To be specific, this invention relates to an aqueous dispersion of an organic peroxide which contains 0.01 to 10% by weight of crystalline cellulose and to an aqueous dispersion of an organic peroxide which contains the aforementioned crystalline cellulose and further contains 0.001 to 10% by weight of at least one surfactant selected from the group consisting of anionic surfactants and non-ionic surfactants.

DETAILED DESCRIPTION OF THE PREFERRED EMBODIMENTS

The aqueous dispersion of an organic peroxide is characterized by the crystalline cellulose. Now, therefore, a description will be made first with respect to the crystalline cellulose.

The term "crystalline cellulose" as used herein means what is obtained by partially depolymerizing natural cellulose such as cotton or regenerated cellulose such as rayon with a mineral acid and refining the resultant depolymerization product. This is a white to grayish white crystalline powder virtually insoluble in water. In other words, the cellulose is first treated (by being boiled in a dilute aqueous alkali solution) for removal of such non-cellulosic components as lignin and consequent recovery of cellulose of high purity.

Then, this high-purity cellulose is hydrolyzed with a dilute acid in such a manner that the polymerization degree of the decomposition residue falls to the equilibrium level. The resultant hydrolyzate is filtered, washed with water, neutralized, and subsequently subjected to attrition or shearing with a high-speed cutting device in the presence of an aqueous medium. The crystalline cellulose produced through the various steps described above possesses several characteristic attributes. One of the characteristics resides in the fact that the crystalline cellulose used has an average polymerization degree falling in the range of 15 to 2,000, which varies depending on the starting material used. Crystalline celluloses having an average polymerization degree falling outside the aforementioned range exhibit low ability to disperse stably. Another characteristic resides in the fact that the crystalline cellulose possesses an exceptionally high chemical purity. The ash content of the crystalline cellulose, for example, is in the range of about 10 to 2,000 parts per million (by weight; similarly applicable hereinafter). The ether extractable content does not exceed about 1,000 parts per million. When the crystalline cellulose component alone is taken out and chemically analyzed, it is found to possess a number of characteristics. It is the physical properties, particularly the particle size of the crystalline cellulose and the amount of the crystalline cellulose to be used that conspicuously affect the shelf life and the polymerization property of the aqueous dispersion of an organic peroxide. The particle size of the crystalline cellulose is in the range of 0.001 to 1,000 μ, preferably 0.01 to 300 μ. The effect of stabilization is improved and the required amount of use is reduced in proportion as the particle size is decreased, and vice versa. The properties possessed by the crystalline cellulose and the method for production thereof are disclosed as in the specification of U.S. Pat. No. 2,978,446. The practice of using the crystalline cellulose as enclosed with a varying macromolecular compound such as, for example, sodium carboxymethyl cellulose or sodium alginate for the purpose of enhancing shelf life and accelerating the speed of dispersion in water is also embraced. The amount of the macromolecular compound thus used is desired to be as small as permissible for the purpose of preventing the properties of the polymer from impairment. As concrete examples of the crystalline cellulose, the products of Asahi Chemical Industry Co., Ltd. marketed under trademark designations of "Avicel RC-N81", "Avicel C-591", and "Avicel RC-N30" and the product of Daisel Chemical Co., Ltd. marketed under product code of "MFC" can be cited.

In the aqueous dispersion contemplated by this invention, the crystalline cellulose is contained in a proportion falling in the range of 0.01 to 10% by weight, preferably 0.1 to 5% by weight. If the content of the crystalline cellulose is unduly small, the produced aqueous dispersion is deficient in shelf life. If this content is unduly large, the aqueous dispersion suffers from a poor property of polymerization and an unduly high viscosity.

This invention does not discriminate among different kinds of the organic peroxide in the aqueous dispersion. All the peroxides in general use are available for use in the production of the aqueous dispersion. Concrete examples of the organic peroxide include peroxydicarbonates such as didecyl peroxydicarbonate, dimyristyl peroxydicarbonate, dicetyl peroxydicarbonate, distearyl peroxydicarbonate, bis(4-t-butylcyclohexyl)-peroxydicarbonate, dicyclohexyl peroxydicarbonate, dibenzyl peroxydicarbonate, di(npropyl) peroxydicarbonate, di(isopropyl) peroxydicarbonate, di(sec-butyl) peroxydicarbonate, dicapryl peroxydicarbonate, di(2-ethylhexyl) peroxydicarbonate, di(2-ethoxyethyl) peroxydicarbonate, and di(methoxyisopropyl) peroxydicarbonate, aliphatic diacyl peroxides such as didecanoyl peroxide, dilauryl peroxide, dimyristyl peroxide, dipropionyl peroxide, diisobutyryl peroxide, and di(3,5,5-trimethylhexanoyl) peroxide, aromatic diacyl peroxides such as dibenzoyl peroxide and nucleus-substituted derivatives thereof, hydroxy peroxides such as 2,5-dihydroperoxy-2,5-dimethylhexane, peroxy esters such as di-t-butyl peroxyisophthalate, t-butyl peroxypivalate, t-butyl peroxyisobutylate, t-butyl peroxy-3,5,5-trimethylhexanoate, t-butyl peroxy-2-ethylhexanoate, t-butyl neodecanoate, cumylperoxy neodecanoate, hexyl neodecanoate, and octyl neodecanoate, dialkyl peroxides such as dicumyl peroxide, $\alpha,\alpha'$-bis(t-butyl peroxyisopropyl) benzene, and 2,5-dimethyl-2,5-di(t-butyl peroxy)-hexyne-3,2,5-dimethyl-2,5-di(t-butyl peroxy) hexane, ketane peroxides such as 1,1'-dihydroxydicyclohexyl peroxide, and acetylcyclohexyl sulfonyl peroxide. Of the organic peroxides solid at normal room temperature, dibenzoyl peroxide, dicetyl peroxidicarbonate and dilauroyl peroxide can advantageously be used. The organic peroxides solid at normal room temperature are converted into an aqueous dispersion only with difficulty as compared with liquid organic peroxides because they are not easy to minutely pulverize even by the use of a powerful dispersing machine such as a colloid mill and, when being further pulverized into smaller particles by the dispersing machine, they are degraded and also because strong condensing force acts on adjacent particles to cause the particles to easily precipitate in a short period of time. However, the present invention can provide a stable aqueous dispersion even though the organic peroxides are solid at normal room temperature. These organic peroxides can be used either singly or in the form of a combination of two or more members. The organic peroxide, when required, may be used diluted or dissolved in an organic solvent such as toluene or aliphatic hydrocarbon. When the organic solvent is thus used, the content of the organic solvent in the produced aqueous dispersion is not more than 30% by weight. The amount of the organic peroxide to be contained in the aqueous dispersion is generally in the range of 5 to 70% by weight, preferably 10 to 60% by weight. If the content is unduly small, the produced aqueous dispersion proves to be uneconomical. If it is excessively large, the aqueous dispersion tends to assume viscosity so high as to impair the ease of handling.

In this invention, the aqueous dispersion is allowed to incorporate therein a surfactant for the purpose of lowering the viscosity thereof or enhancing the shelf life. The surfactant may be any of the conventional surfactants. It is particularly desirable to use at least one surfactant selected from the group consisting of anionic surfactants and non-ionic surfactants.

Examples of the anionic surfactant include fatty acid salts such as sodium oleate and castor oil potassium soap, N-acylamino acid salt, alkyl ether carboxylates, acylated peptides, alkyl sulfonates, alkylallyl sulfonate such as sodium dodecylbenzenesulfonate, alkylnaphthalenesulfonates, derivatives of naphthalenesulfonates, sodium salts of $\beta$-naphthalenesulfonic acid-formalin condensate, dialkylsulfosuccinates, $\alpha$-olefinsulfonates, N-acylsulfonates, higher alcohol sulfuric ester such as sodium cetyl sulfate, polyoxyethylene alkyl ether sulfonates, polyoxyethylene alkylphenol ether sulfates, alkylamide sulfates, alkyl phosphates, alkyl ether phosphates, alkylallyl ether phosphoric acid and macromolecular surfactants such as polycarboxylic acids. Of these anionic surfactants, those not having nitrogen atoms contained in the molecules thereof, such as fatty acid salts including sodium oleate, alkylallyl sulfonates including sodium dodecylbenzenesulfonate, and dialkylsulfosuccinates including sodium dioctylsulfosuccinate can advantageously be used.

Examples of the non-ionic surfactant include alkyl polyoxyethylene ethers such as polyoxyethylene stearyl ether, alkylallyl polyoxyethylene ether such as polyoxyethylene nonylphenol ether, alkylallyl formaldehyde-condensed polyoxyethylene ethers, block polymers having polyoxypropylene as an oleophilic group, polyoxyethylene ethers of glycerin fatty acid esters, sorbitan fatty acid esters such as sorbitan oleate, polyoxyethylene ethers of sorbitan fatty acid esters, sorbitol fatty acid esters, glycerin fatty acid esters, polyglycerin fatty acid esters, propylene glycol fatty acid esters, sucrose fatty acid esters, fatty acid alkanol amides, polyoxyethylene fatty acid amides, polyoxyethylene alkyl amines, and amine oxides. Of these non-ionic surfactants, those not having nitrogen atoms contained in the molecules thereof, such as sorbitan fatty acid esters and alkyl polyoxyethylene ethers, and those not causing deterioration of the electrical characteristics of a polymer of unsaturated ethylene monomers, i.e. not having polyethyleneoxide groups contained in the molecules thereof, such as sucrose fatty acid esters, glycerin fatty acid esters, sorbitol fatty acid esters, propylene glycol fatty acid esters and sorbitan fatty acid esters are preferably used. The kind and the amount of a surfactant to be used may be suitably selected, depending on the viscosity and the shelf life desired to be obtained. The amount of the surfactant to be used generally falls in the range of 0.001 to 10% by weight, preferably 0.01 to 5% by weight. If the amount of the surfactant so used is small, the effect of stabilization aimed at is absent. If this amount is unduly large, the produced aqueous dispersion proves to be uneconomical.

A cationic surfactant may be used on condition that it is incapable of rapidly decomposing the organic peroxide being suspended in the aqueous medium. Generally the use of a cationic surfactant proves to be undesirable because the cationic surfactant is generally capable of decomposing an organic peroxide.

The aqueous dispersion of an organic peroxide contemplated by the present invention is composed of an organic peroxide, crystalline cellulose, and water or of an organic peroxide, crystalline cellulose, at least one surfactant selected from the group consisting of anionic surfactants and non-ionic surfactants, and water. It may additionally incorporate therein such substances as coagulation point depressant, colloid protective agent, and dispersion aid, which are generally used in any aqueous dispersion.

There are times when aqueous dispersions are to be stored at temperatures below 0° C., for example. In this case, the aqueous dispersion is desired to incorporate therein a low molecular weight mono-ol such as methyl alcohol or a low molecular weight diol such as ethylene glycol for the purpose of being prevented from coagulation. The upper limit of the mono-ol or diol content is 30% by weight.

Further for the purpose of improving the shelf life, the aqueous dispersion may incorporate therein any of the conventional colloid protective agents. As examples of the colloid protective agent, there may be cited water-soluble cellulose derivatives such as methyl cellulose and sodium caboxymethyl cellulose, synthetic water-soluble macromolecular substances such as partially or completely saponified polyvinyl acetate and polysodium acrylate, natural water-soluble macromolecular substances such as sodium alginate, tragacanth rubber, and gum arabic, and water-soluble starch derivatives such as starch sodium glucolate. The content of the colloid protective agent is not more than 5% by weight.

In addition to the additives mentioned above, the aqueous dispersion of the present invention is allowed to incorporate such substances as a dispersion aid typified by sodium hexametaphosphate and an alkaline substance typified by sodium carbonate or sodium hydroxide when necessary.

The aqueous suspension of the present invention can be produced as follows. First, water and crystalline cellulose or water, crystalline cellulose, and a surfactant are placed in a container. Then, a given organic peroxide is added to and dispersed in the contents of the container. Though this is the usual procedure, it may be reversed as occasion demands.

The device to be used for the production of the aqueous dispersion of the present invention may be any of the conventional dispersion devices. Examples of the device are a mechanically rotary stirrer, a colloid mill, a high-speed shearing device, an ultrasonic homogenizer, and a three-roll mill.

As examples of the ethylenically unsaturated monomer which can be polymerized or copolymerized with the aqueous dispersion of the present invention, there can be cited vinyl chloride, styrene, vinyl acetate, acrylates, acrylonitrile, methyl methacrylates, and butadiene. In the polymerization or copolymerization of such an ethylenically unsaturated monomer, the aqueous dispersion is used in an amount which falls in the conventional range. And, the polymerization itself can be carried out by any of the conventional methods.

The aqueous dispersion of the present invention enjoys various advantages as shown below. Firstly, since it possesses a low viscosity and enjoys a highly satisfactory shelf life, it can be handled and conveyed with great ease. Further, since it is enabled to acquire the aforementioned characteristics by merely containing an organic peroxide and crystalline cellulose, it is possible, when necessary, to enhance these characteristics further by additionally incorporating an anionic surfactant and/or a non-ionic surfactant. Secondly, even when an ethylenically unsaturated monomer is polymerized by the use of the aqueous suspension of the invention as a polymerization initiator, the stability of the polymerization system is not degraded and the properties of the produced polymer are not impaired. This invention, therefore, enables the polymerization of an ethylenically unsaturated monomer to be carried out safely in a closed state without any anxiety about environmental pollution.

Now, the present invention will be described more specifically below with reference to working examples and comparative experiments.

EXAMPLES 1-12

In the accompanying table, various compositions of the aqueous dispersion of an organic peroxide of the present invention prepared in the respective examples and the characteristics of these dispersions measured by the methods to be described below are shown.

The aqueous dispersions were prepared as follows. First, the components other than an organic peroxide were mixed to form a homogeneous liquid. Then, the organic peroxide was added to the homogeneous liquid, with the liquid kept stirred.

After the addition was completed, all the components in a combined state were further stirred with a homomixer (product of Tokushu Kika Kogyo K. K.; dispersion temperature 25° C.) to give rise to a homogeneous aqueous dispersion.

The aqueous dispersions obtained consequently were tested for viscosity, shelf life, and ability to cause polymerization of vinyl chloride or styrene by the following methods.

(Determination of viscosity)

The viscosity of a sample at 20° C. was measured by the use of a viscosimeter, type B (product of Tokyo Keiki Seizo K. K.; rotational speed 20 RPM). To be specific, the viscosity was measured by immersing a rotor of the viscosimeter in the sample, detecting viscosity torque of the rotor generated by rotating the rotor with a motor, and reading the indicator of a torque converter.

(Test for shelf life)

A given sample was left standing in a glass container kept at 20° C. or at −10° C. (for a period long enough for separation of at least 5% of the aqueous layer or organic layer) At the end of the standing, the sample was visually examined for change in appearance and evaluated for shelf life based on the degree of change in appearance as a criterion.

(Test for ability to effect suspension polymerization of vinyl chloride)

In an autoclave, 0.45 part by weight of polyvinyl alcohol, 300 parts by weight of water, 100 parts by weight of vinyl chloride, and various amounts of the relevant aqueous dispersion of an organic peroxide indicated in the table (Examples 6 through 12 and Comparative Experiment 3) were stirred and at the same time heated until 58° C. and then left to polymerize until completion of the reaction. Subsequently, the polymer thus obtained was separated by filtration and dried and tested for conversion into white powdery polyvinyl chloride.

A mixture obtained by combining 100 g of the produced polyvinyl chloride, 50 g of dioctyl phthalate, and 8 g of tribasic lead sulfate was kneaded with rollers for 10 minutes. Subsequently, the resultant dough was pressed at 160° C. to produce a plate. The plate was tested for volume resistivity in accordance with JIS K6723 "Soft Polyvinyl Chloride Compound" which defines a method comprising attachment of electrodes to a sheet-like test piece having a thickness of about 1 mm, application of DC voltage to the test piece and measurement of volume resistivity of the test piece after one-minute voltage application.

(Test for ability to effect suspension polymerization of styrene)

In an autoclave provided with a stirrer and a thermometer and having an inner volume of 5 liters, 90 parts by weight of water was placed and kept stirred. Then, 0.125 part by weight of tricalcium phosphate (product of Nippon Chemical Industrial Co., Ltd.), 0.004 part by weight of sodium dodecyl benzenesulfonate (product of Nippon Oil & Fats Co., Ltd.), and such an amount of the relevant aqueous suspension of an organic peroxide of this invention (Examples 1 through 5 and 12 and Comparative Experiments 1 and 2) that the organic peroxide component in the suspension accounted for 0.30 part by weight were placed and homogeneously dispersed in the stirred water. 100 parts by weight of styrene was added, and the resultant homogeneous mixture was thoroughly stirred and heated to 94° C. for polymerization. Subsequently, the polymer obtained as a result was separated by filtration and dried, and the conversion thereof into solid beads of polystyrene polymer was calculated.

Then, the polymer beads obtained respectively in the examples were statistically estimated for shape, divided into true spheres and flat flakes. In the table, the proportions of flat flakes among all the polymer particles obtained in the respective examples are shown.

COMPARATIVE EXPERIMENTS 1 THROUGH 3

Aqueous dispersions of varying compositions indicated in the table were obtained by treating respective components, following the procedure of the working examples described above. Then, the produced aqueous suspensions were tested for various properties by faithfully following the procedure of the working examples. The results of these tests are also shown in the table.

The aqueous dispersion of Comparative Experiment 1 was prepared by following the procedure described in Dutch Pat. No. 75 03051, that of Comparative Experiment 2 the procedure of Swedish Pat. No. 80 00669, and that of Comparative Experiment 3 the procedure of European Pat. No. 32,757, respectively.

TABLE

| | | | EXAMPLE | | | | | | | |
|---|---|---|---|---|---|---|---|---|---|---|
| | | | 1 | 2 | 3 | 4 | 5 | 6 | 7 | 8 |
| Composition of aqueous dispersion of organic peroxide (% by weight) | | | | | | | | | | |
| Organic peroxide | Dibenzoyl peroxide | | 30.00 | 30.00 | 30.00 | 50.00 | 20.00 | 0 | 0 | 0 |
| | Dicetyl peroxydicarbonate | | 0 | 0 | 0 | 0 | 0 | 0 | 0 | 0 |
| | Dilauroyl peroxide | | 0 | 0 | 0 | 0 | 0 | 30.00 | 0 | 0 |
| | Di(2-ethylhexyl) peroxydicarbonate | | 0 | 0 | 0 | 0 | 0 | 0 | 40.00 | 0 |
| | t-Butyl neodecanoate*1 | | 0 | 0 | 0 | 0 | 0 | 0 | 0 | 40.00 |
| | Di(3,5,5-trimethylhexanoyl) peroxide*2 | | 0 | 0 | 0 | 0 | 0 | 0 | 0 | 0 |
| Dispersant Crystalline cellulose | Avicel RC-N81*3 | | 0 | 0.50 | 0 | 1.00 | 10.00 | 0 | 1.00 | 1.00 |
| | Avicel RC-591*3 | | 1.00 | 0.50 | 0 | 0 | 0 | 1.00 | 0 | 0 |
| | MFC*4 | | 0 | 0 | 0.10 | 0 | 0 | 0 | 0 | 0 |
| | Polyvinyl alcohol | | 0 | 0 | 0 | 0 | 0 | 0 | 0.30 | 0 |
| | Methyl cellulose | | 0 | 0 | 0 | 0 | 0 | 0 | 0 | 0.30 |
| Surfactant*5 | Newlex R | | 0 | 0.05 | 0.05 | 0 | 0.05 | 0 | 0 | 0 |
| | Rapizol B-80 | | 0 | 0 | 0 | 0.05 | 0 | 0 | 0 | 0 |
| | Nonion OP-80R | | 0 | 0 | 0 | 0 | 0 | 1.00 | 1.00 | 0 |
| | Nonion S-215 | | 0 | 0 | 0 | 0 | 0 | 0 | 0 | 0.10 |
| Ethylene glycol | | | 0 | 0 | 10.00 | 0 | 0 | 0 | 20.00 | 20.00 |
| Water | | | 69.00 | 68.95 | 59.85 | 48.95 | 69.95 | 68.00 | 37.70 | 38.60 |
| Characteristics | | | | | | | | | | |
| Viscosity (poise) | | | 10.00 | 8.0 | 8.5 | 16.0 | 16.0 | 8.5 | 1.0 | 2.0 |
| Shelf life*6 | Number of days stability | | 1.0 M. | 1.5 M. | 1.0 M. | 2.0 M. | 2.0 M. | 1.5 M. | 2.5 M. | 2.0 M. |
| | Temperature of storage | | 20° C. | 20° C. | 20° C. | 20° C. | 20° C. | 20° C. | −10° C. | −10° C. |
| Property of polymerization | Polymerization of vinyl | Conversion | — | — | — | — | — | 84 | 85 | 86 |
| | | Value resistivity of | — | — | — | — | — | 6.1 | 5.5 | 3.5 |

TABLE-continued

| | | | | | | | | | |
|---|---|---|---|---|---|---|---|---|---|
| chloride | polymer ($\times 10^{13} \cdot \Omega cm$) | | | | | | | | |
| Polymerization of styrene | Conversion | 90 | 89 | 93 | 91 | 92 | — | — | — |
| | Proportion of flat flakes in polymer particles (%) | 5% ≧ | 5% ≧ | 5% ≧ | 5% ≧ | 5-10% | — | — | — |

| | | EXAMPLE | | | | COMPAR. EXPERIMENT | | |
|---|---|---|---|---|---|---|---|---|
| | | 9 | 10 | 11 | 12 | 1 | 2 | 3 |
| Composition of aqueous dispersion of organic peroxide (% by weight) | | | | | | | | |
| Organic peroxide | Dibenzoyl peroxide | 0 | 0 | 0 | 30.00 | 50.00 | 30.00 | 0 |
| | Dicetyl peroxydicarbonate | 0 | 0 | 30.00 | 0 | 0 | 0 | 0 |
| | Dilauroyl peroxide | 0 | 0 | 0 | 0 | 0 | 0 | 0 |
| | Di(2-ethylhexyl) peroxydicarbonate | 0 | 30.00 | 0 | 0 | 0 | 0 | 40.00 |
| | t-Butyl neodecanoate*1 | 0 | 0 | 0 | 0 | 0 | 0 | 0 |
| | Di(3,5,5-trimethylhexanoyl) peroxide*2 | 40.00 | 0 | 0 | 0 | 0 | 0 | 0 |
| Dispersant | Avicel RC-N81*3 | 1.00 | 0 | 0 | 0 | 0 | 0 | 0 |
| Crystalline cellulose | Avicel RC-591*3 | 0 | 0 | 1.00 | 3.00 | 0 | 0 | 0 |
| | MFC*4 | 0 | 0.10 | 0 | 0 | 0 | 0 | 0 |
| | Polyvinyl alcohol | 0 | 0 | 0 | 0 | 0 | 0 | 0 |
| | Methyl cellulose | 0.30 | 0 | 0 | 0 | 1.00 | 2.00 | 1.00 |
| Surfactant*5 | Newlex R | 0 | 0 | 0 | 0.05 | 0.50 | 0 | 0 |
| | Rapizol B-80 | 0 | 0 | 0 | 0 | 0 | 0 | 0 |
| | Nonion OP-80R | 1.00 | 10.00 | 1.00 | 0 | 0.50 | 0 | 0 |
| | Nonion S-215 | 0 | 0 | 0 | 0 | 0 | 1.50 | 1.00 |
| Ethylene glycol | | 20.00 | 15.00 | 0 | 0 | 0 | 0 | 15.00 |
| Water | | 37.70 | 44.99 | 68.00 | 66.95 | 48.00 | 66.50 | 43.00 |
| Characteristics | | | | | | | | |
| Viscosity (poise) | | 1.5 | 5.0 | 7.0 | 25.0 | 50.0 | 15.0 | 2.0 |
| Shelf life*6 | Number of days of stability | 2.0 M. | 1.5 M. | 1.0 M. | 3.0 M. | 2 W. | 1 W. | 1 M. |
| | Temperature of storage | −10° C. | −10° C. | 20° C. | 20° C. | 20° C. | 20° C. | −10° C. |
| Property of polymerization | Polymerization of vinyl chloride | Conversion | 81 | 82 | 83 | — | — | — | 84 |
| | | Volue resistivity of polymer ($\times 10^{13} \cdot \Omega cm$) | 5.6 | 5.4 | 5.9 | — | — | — | 1.0≧ |
| | Polymerization of styrene | Conversion | — | — | — | 86 | 85 | 86 | — |
| | | Proportion of flat flakes in polymer particles (%) | — | — | — | 20-30% | ≧30% | ≧50% | — |

The asterisked numerals shown in the table have the following meanings.

*1 The proportion, 40% by weight, of t-butyl neodecanoate consists of 30% by weight of t-butyl neodecanoate in a pure form and 10% by weight of Shellzol 71 (a hydrocarbon-based solvent produced by Shell Chemical Co., Ltd.).

*2 The proportion, 40% by weight, of di(3,5,5-trimethylhexanoyl) peroxide consists of 30% by weight of di(3,5,5-trimethylhexanoyl) peroxide in a pure form and 10% by weight of toluene.

*3 Avicel is a proprietary trademark designation used by Asahi Chemical Industry Co., Ltd. on crystalline cellulose series. Avicel RC-N81 contains about 25% by weight of natural polysaccharide as a water-soluble macromolecular compound for coating crystalline cellulose. Avicel RC-591 contains about 10% by weight of sodium carboxymethyl cellulose as a water-soluble macromolecular compound for coating crystalline cellulose. These Avicel species have particle diameters approximately in the range of 0.1 to 10μ. Their mean degrees of polymerization are roughly in the range of 100 to 300. Their exclusive crystalline cellulose components possess extremely high purity.

*4 MFC is a proprietary trademark designation used by Daisel Chemical Co., Ltd. on a crystalline cellulose product. This crystalline cellulose contains substantially no water-soluble macromolecular substance and has particle diameters approximately in the range of 0.1 to 200μ. Their mean degrees of polymerization are roughly in the range of 500 to 1,500. Its exclusive crystalline cellulose component possesses extremely high purity. Aqueous dispersions were prepared by following the procedure of Example 3, except that crystalline cellulose having particle diameters of about 200 to 500μ was used in place of MFC, and these aqueous dispersions were tested for property of polymerization. As a result, the property of styrene polymerization, namely, the conversion and the ratio of flat flakes to the total of polymer particles, were the same, whereas the shelf life was low falling in the range of 1 to 2 W.

*5 These are proprietary trademark designations used by Nippon Oil & Fats Co., Ltd. on its surfactant products. Newlex R consists of sodium n-dodecylbenzene sulfonate, Rapizol B-80 consists of sodium dioctylsulfosuccinate, Nonion OP-80R consists mainly of sorbitan monoleate, and Nonion.S-125 consists of polyoxyethylene stearyl ether (HLB: 14.2).

*6 M stands for month and W for week. From the experiments described above, it is clearly noted that the aqueous dispersions cited in working examples as conforming to the present invention possessed far better properties than those cited in the comparative experiments, in terms of vicosity, shelf life, and property of polymerization evaluated collectively.

The asterisked numerals shown in the table have the following meanings. *1. The proportion, 40% by weight, of t-butyl neodecanoate consists of 30% by weight of t-butyl neodecanoate in a pure form and 10% by weight of Shellzol 71 (a hydrocarbon-based solvent produced by Shell Chemical Co., Ltd.). *2. The proportion, 40% by weight, of di(3,5,5-trimethylhexanoyl) peroxide consists of 30% by weight of di(3,5,5-trimethylhexanoyl) peroxide in a pure form and 10% by weight of tuluene. *3. Avicel is a proprietary trademark designation used by Asahi Chemical Industry Co., Ltd. on crystalline series. Avicel RC-N81 contains about 25% by weight of natural polysaccharide as a water-soluble macromolecular compound for coating crystalline cellulose. Avicel RC-591 contains about 10% by weight of sodium carboxymethyl cellulose as a water-soluble macromolecular compound for coating crystalline cellulose. These Avicel species have particle diameters approximately in the range of 0.1 to 10 μ. Their means degrees of polymerization are roughly in the range of 100 to 300. Their exclusive crystalline cellulose components possess extremely high purity. *4. MFC is a proprietary trademark designation used by Daisel Chemical Co., Ltd. on a crystalline cellulose product. This crystalline cellulose contains substantially no water-soluble macromolecular substance and has particle diameters approximately in the range of 0.1 to 200 μ. Their mean degrees of polymerization are roughly in the range of 500 to 1,500. Its exclusive crystalline cellulose component possesses extremely high purity.

Aqueous dispersions were prepared by following the procedure of Example 3, except that crystalline cellulose having particle diameters of about 200 to 500 μ was used in place of MFC, and these aqueous dispersions were tested for property of polymerization. As a result, the property of styrene polymerization, namely, the conversion and the ratio of flat flakes to the total of polymer particles, were the same, whereas the shelf life was low falling in the range of 1 to 2 W. *5. These are proprietary trademark designations used by Nippon Oil & Fats Co., Ltd. on its surfactant products. Newlex R consists of sodium n-dodecylbenzene sulfonate, Rapizol B-80 consists of sodium dioctylsulfosuccinate, Nonion OP-80R consists mainly of sorbitan monoleate, and Nonion S-215 consists of polyoxyethylene stearyl ether (HLB: 14.2). *6. M stands for month and W stands for week.

From the experiments described above, it is clearly noted that the aqueous dispersions cited in working examples as conforming to the present invention possessed far better properties than those cited in the comparative experiments, in terms of viscosity, shelf life, and property of polymerization evaluated collectively.

I claim:

1. An aqueous dispersion consisting essentially of an organic peroxide of at least one member selected from the group consisting of peroxydicarbonates, aliphatic diacylperoxides, and aromatic diacylperoxides and assuming a solid state at normal room temperature and 0.01 to 10% by weight, based on the amount of said dispersion, of particles of crystalline cellulose having diameters in the range of 0.001 to 1,000 μ, an average polymerization degree in the range of 15 to 2,000, an ash content falling in the range of 10 to 2,000 parts per million by weight and an ether extractable content not exceeding 1,000 parts per million by weight.

2. An aqueous dispersion consisting essentially of an organic peroxide of at least one member selected from the group consisting of peroxydicarbonates, aliphatic diacylperoxides, and aromatic diacylperoxides and assuming a solid state at normal room temperature and 0.01 to 10% by weight, based on the amount of said dispersion, of particles of crystalline cellulose having diameters in the range of 0.001 to 1,000 μ, an average polymerization degree in the range of 15 to 2,000, an ash content falling in the range of 10 to 2,000 parts per million by weight and an ether extractable content not exceeding 1,000 parts per million by weight and 0.001 to 10% by weight, based on the amount of said dispersion, of at least one surfactant selected from the group consisting of anionic surfactants and nonionic surfactants.

3. The aqueous dispersion according to claim 2, wherein said anionic surfactants contain no nitrogen atom in their molecules.

4. The aqueous dispersion according to claim 2, wherein said non-ionic surfactants contain no nitrogen atom in their molecules.

5. The aqueous dispersion according to claim 2, wherein said non-ionic surfactants contain no polyethyleneoxide group in their molecules.

* * * * *